United States Patent
Bartolome et al.

(10) Patent No.: US 7,149,805 B2
(45) Date of Patent: Dec. 12, 2006

(54) WIRELESS TRUSTED POINT OF ACCESS TO A COMPUTER NETWORK

(75) Inventors: Emiliano Bartolome, Palo Alto, CA (US); Gary L. Vondran, Jr., San Carlos, CA (US)

(73) Assignee: Hewlett-Packard Development, L.P., Houston, TX (US)

( * ) Notice: Subject to any disclaimer, the term of this patent is extended or adjusted under 35 U.S.C. 154(b) by 626 days.

(21) Appl. No.: 09/999,395

(22) Filed: Oct. 31, 2001

(65) Prior Publication Data

US 2003/0083062 A1    May 1, 2003

(51) Int. Cl.
*G06F 15/16* (2006.01)
(52) U.S. Cl. ........................ 709/229; 709/250
(58) Field of Classification Search ............... 709/219, 709/225, 227, 229, 230, 248, 223, 224, 226, 709/246, 250, 249; 455/432.2, 564, 420; 380/270; 370/338
See application file for complete search history.

(56) References Cited

U.S. PATENT DOCUMENTS

| | | | |
|---|---|---|---|
| 4,665,519 A | 5/1987 | Kirchner et al. | 370/94 |
| 5,490,139 A | 2/1996 | Baker et al. | 370/60 |
| 5,546,397 A | 8/1996 | Mahany | 370/85.1 |
| 5,594,731 A | 1/1997 | Reissner | 370/338 |
| 5,654,959 A | 8/1997 | Baker et al. | 370/331 |
| 5,673,322 A | 9/1997 | Pepe et al. | 380/49 |
| 5,745,884 A * | 4/1998 | Carnegie et al. | 705/34 |
| 5,960,344 A | 9/1999 | Mahany | |
| 5,983,098 A | 11/1999 | Gerszberg et al. | 455/426 |
| 6,075,860 A | 6/2000 | Ketcham | 380/25 |
| 6,128,661 A * | 10/2000 | Flanagin et al. | 709/227 |
| 6,134,548 A * | 10/2000 | Gottsman et al. | 707/5 |
| 6,151,628 A | 11/2000 | Xu et al. | 709/225 |
| 6,201,962 B1 * | 3/2001 | Sturniolo et al. | 455/432.2 |
| 6,205,495 B1 | 3/2001 | Gilbert et al. | 710/8 |
| 6,233,608 B1 | 5/2001 | Laursen et al. | 709/217 |
| 6,253,326 B1 | 6/2001 | Lincke et al. | 713/201 |
| 6,477,543 B1 * | 11/2002 | Huang et al. | 707/200 |
| 6,701,361 B1 * | 3/2004 | Meier | 709/224 |
| 2002/0032042 A1 * | 3/2002 | Poplawsky et al. | 455/564 |
| 2002/0176579 A1 * | 11/2002 | Deshpande et al. | 380/270 |
| 2003/0012163 A1 * | 1/2003 | Cafarelli et al. | 370/338 |
| 2003/0073432 A1 * | 4/2003 | Meade, II | 455/420 |
| 2004/0201709 A1 * | 10/2004 | McIntyre et al. | 348/211.2 |

FOREIGN PATENT DOCUMENTS

| | | |
|---|---|---|
| WO | WO 01/37517 | 5/2001 |

* cited by examiner

*Primary Examiner*—Paul H. Kang (57) ABSTRACT

A communication system includes a computer network that includes a plurality of interconnected computer devices. The communication system further includes at least one network device capable of communicating with one or more mobile wireless devices. The network device is part of the computer network and is capable of communicating with a mobile wireless device without the mobile wireless device being a member of the computer network.

20 Claims, 6 Drawing Sheets

WIRELESS TRUSTED POINT OF ACCESS TO A COMPUTER NETWORK

FIELD OF THE INVENTION

The present invention relates generally to computer networks, and more particularly to communication between a wireless device and a computer network.

BACKGROUND OF THE INVENTION

Computer networks are linked computers and computer devices (such as peripheral devices) that are used to obtain, manipulate, and transfer digital data. As a result, a computer network is a highly important communication medium. A computer network may be used for text, audio, video, and graphics data. They are becoming an increasingly popular tool for institutions such as corporations, governmental entities, etc., in terms of providing word processing, graphics, e-mail, etc. As institutional use increases, there is an increasing need for computer networks that provide not only computer services to multiple users, but also provide computer services over multiple locations.

Another increasingly popular type of digital device is a wireless device, such as cell phones, personal digital assistants (PDA), laptop or notebook computers, pagers, etc. These wireless devices are generally small, light-weight, and portable. They use battery power and may be carried with the user. They generally communicate with a fixed wireless infrastructure, such as a cellular telephone network infrastructure, for example. Alternatively, the infrastructure may be a satellite or satellite wireless network, a wireless modem, a wireless modem network, etc.

Such wireless devices may be connected to a computer network in various ways. In the prior art, the simplest approach has been to connect via a wire harness. For example, a laptop computer may be physically connected to a land-based computer network.

However, a wire harness has several drawbacks. One drawback is that the user has to find an available port. Therefore, the computer network that the user is trying to connect to must include extra ports for such a purpose and a port must be available at the time the user wants to connect to it. Another drawback is that there is no mobility for the user while the device is connected. Furthermore, a wire or harness connection may require a user to stop whatever he or she is doing and look for an access port.

Figure 1:
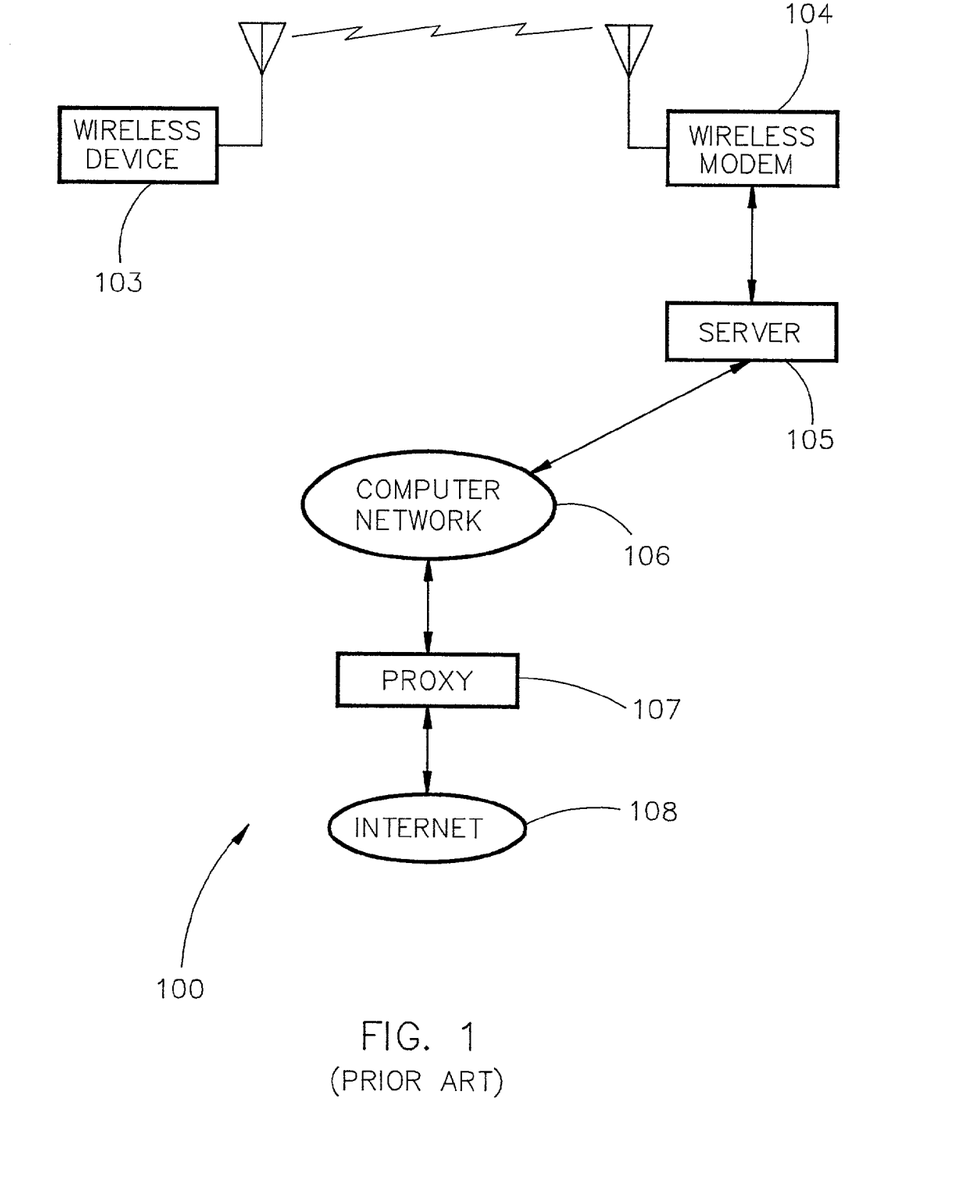
FIG. 1 shows a prior art network having a wireless access capability.

FIG. 1 shows a prior art network 100 having a wireless access capability. In this figure, the wireless device 103 is connected to a wireless modem 104, with the wireless modem 104 being further connected to a dedicated server 105. The server 105 is connected to a computer network 106 (or computer intranetwork (intranet), i.e., one or more networks interconnected within an entity, such as a corporation, etc.). The computer network 106 may additionally be connected to the Internet 108 via a proxy 107. The proxy 107 may perform protocol conversion, etc.

Alternatively, instead of the wireless modem 104 being directly connected to the server 105, the wireless modem 104 may be connected through the Public Switched Telephone Network (PSTN) via a telephone line to the server 105. This provides a low speed access through a dial-up service provider, with the dial-up service provider furnishing the server 105.

There are several drawbacks to this prior art arrangement. The dial up and connect time using the wireless modem 104 is slow and may be frustrating. In addition, the user may be subjected to the limited availability of the wireless modem 104. Moreover, the wireless device 103 may be out of the service provider's area, and therefore the connection to the wireless modem 104 may be costly if the user has to pay for long distance connect charges (such as through a cellular infrastructure, for example).

Figure 2:
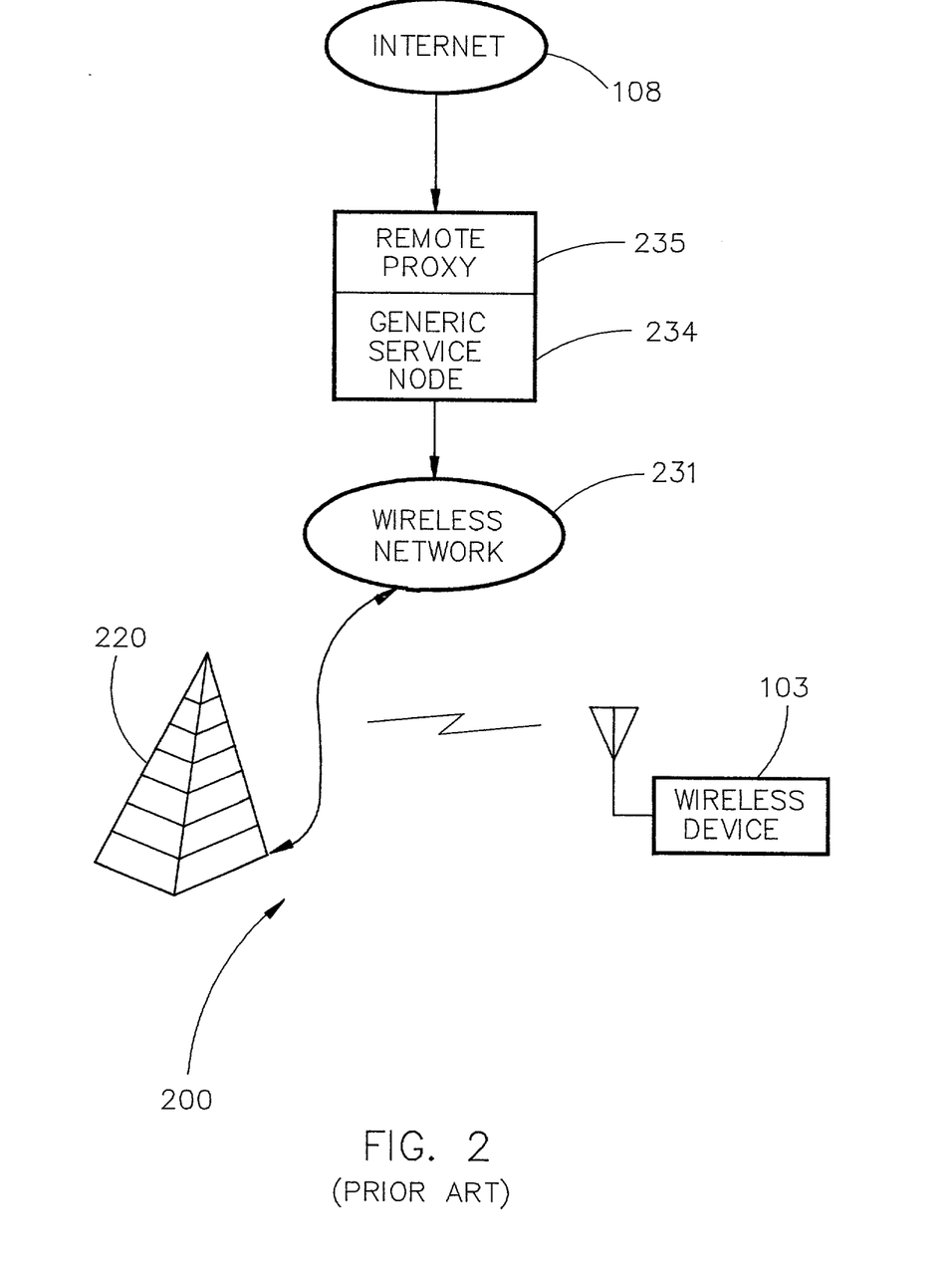
FIG. 2 shows another prior art network having a wireless access capability.

FIG. 2 shows another prior art network 200 having a wireless access capability. In this arrangement, the wireless device 103 communicates with a base station 220 that is a component of a wireless network 231. The base station 220 may be, for example, a cellular infrastructure base station and the wireless network 231 may be a cellular telephone network. The wireless network 231 is connected to a generic service node 234 and remote proxy 235. The remote proxy 235 again may communicate with the Internet 108 (or other networks). The wireless device 103 may therefore communicate with the Internet 108 (or other network) through the wireless network 231 and the base station 220.

This prior art approach also has several drawbacks. First, the wireless device 103 must be within the service area of a base station 220. Furthermore, the wireless network 231 must be able to communicate with a proxy 235 that can communicate with both the Internet 108 and the wireless network 231. In addition, the user of the wireless device 103 must have an account with the service provider of the wireless network 231. Therefore, the user needs a prior arrangement for service (i.e., the user of the wireless device 103 must subscribe to one or more wireless service providers). Furthermore, the user has no control over whether the wireless infrastructure is available and may suffer from slow access if communication traffic is heavy. Moreover, the user must still have an account in order to access the Internet 108, as communication with the wireless network does not guarantee Internet access without a prior arrangement.

The prior art approaches therefore provide network access by providing a wireless communication device that is linked to a network interface device that communicates with the computer network. This adds an extra layer of complexity to a network access operation and as a result adds extra time to the access operation. In addition, the access operation may still be less than optimal, as the user of the wireless device 103 may first have to perform a login operation with the network interface device and then perform another login operation with the network.

Therefore, there remains a need in the art for improvements in wireless device access to computer networks.

SUMMARY OF THE INVENTION

A communication system comprises a computer network that includes a plurality of interconnected computer devices. The communication system further comprises at least one network device capable of communicating with one or more mobile wireless devices. The network device is part of the computer network and is capable of communicating with a mobile wireless device without the mobile wireless device being a member of the computer network.

DETAILED DESCRIPTION

Figure 3:
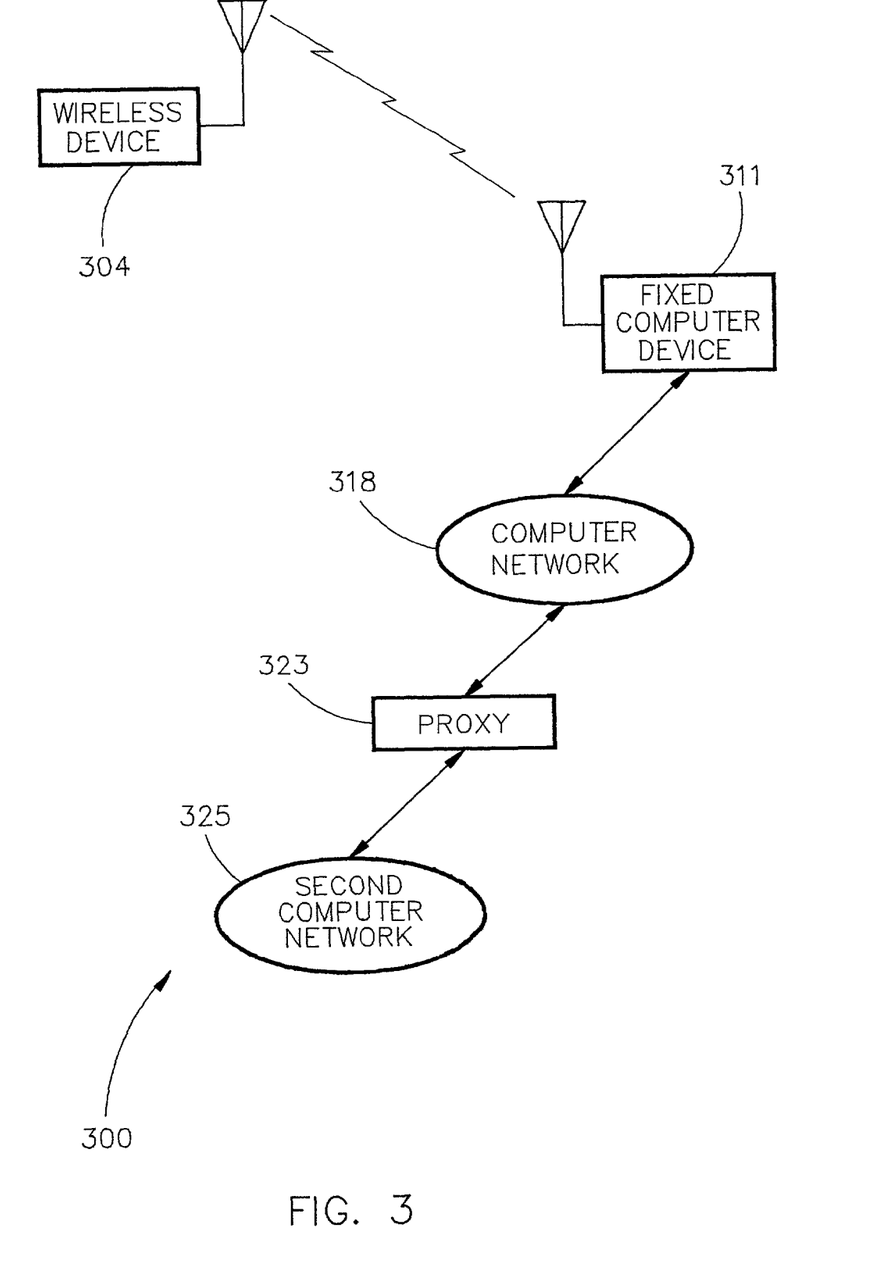
FIG. 3 shows a communication system that provides a wireless trusted point of access to a computer network according to one embodiment of the invention.

FIG. 3 shows a communication system 300 that provides a wireless trusted point of access to a computer network according to one embodiment of the invention. The system 300 may include one or more wireless devices 304, a network member fixed computer device 311, and a computer network 318. In addition, the computer network 318 may be connected to and communicate with a second computer network 325 through a proxy (or proxy server) 323 or similar device (such as a gateway, bridge, or router).

The wireless device 304 may be any type of mobile wireless device capable of communicating in a wireless manner with other wireless devices. This may include radio frequency communication and may additionally include infrared communication. The wireless device 304 may be, for example, a cellular telephone, a pager, a laptop or notebook computer, a pager, a personal digital assistant (PDA), etc.

The network member device 311 is a part of the computer network 318 and may be any manner of computer device capable of communicating with other network members. The network member device 311 is not itself a wireless infrastructure device. For example, the network member device 311 may be a personal computer, a network workstation, a dumb terminal, a printer, a copier, a scanner, a facsimile, a disk or tape drive, a disk drive server, etc. The network member device 311 may be any of the devices as modified according to the invention and therefore capable of communicating with the wireless device 304. The network member device 311 will be discussed further below in conjunction with FIG. 4.

The computer network 318 may be any type of computer network or interconnected computer networks. A computer network is a plurality of generally non-mobile computers and computer devices linked by a network of wires, cables, or optical fibers, and by a network communication protocol. For example, the computer network may be a local area network (LAN), a wide area network (WAN), a virtual private network (VPN), etc. Furthermore, the computer network 318 may comprise various interconnected networks. For example, the computer network 318 may be a computer network comprising one or more interlinked computer networks within an entity, such as a corporation, educational institution, governmental institution or department, etc. Such interlinked institutional networks are commonly referred to as an intranet.

The network member device 311 is physically connected to the computer network 318 in some manner, preferably such as by a typical network connection (i.e., a cable or wire). As a result, when the wireless device 304 is communicating with the network member device 311, the wireless device 304 is directly connected to the computer network 318.

The network member device 311 may perform, among other things, protocol conversion, access control, and security measures. The access control and security measures may include regulating connectivity of users by providing and checking an account and password for each wireless device 304 and optionally for each user, and may further include encryption/decryption, etc. Since the only point of access for the wireless device 304 to the computer network 318 is provided by the network member device 311, the network member device 311 will preferably not direct any communication to the wireless device 304 unless the communication is actually directed to the wireless device 304.

The network member device 311 may additionally track usage characteristics, such as access duration, printing, CPU time, memory usage, bytes transferred, services used, addresses of network members accessed by the wireless device 304, access to the second network 325 (including access duration), transactions, etc. The network member device 311 therefore may establish and track all interactions (sessions or transactions) initiated by the wireless device 304. This includes interactions between the wireless device 304 and the computer network 318, and optionally interacts with other networks.

The network member device 311 may also perform routing of a communication from the wireless device 304 to another network member device within the computer network 318. Further, the network member device 311 may perform encryption and decryption of all communications passing between the network member device 311 and the computer network 318.

The proxy (or proxy server) 323 may be any type of device that relays communications between the computer network 318 and other networks, such as the second network 325. The proxy may provide protocol conversion, routing, etc. The proxy 323 may provide communication between the computer network 318 and the Internet 325. The proxy 323 may further provide communication with any other manner of computer network or even with a wireless infrastructure (not shown). Therefore, through the network member device 311 and the computer network 318, the wireless device 304 may be quickly and directly connected to the Internet, or any other network or networks.

In one embodiment, the network member device 311 may show the resources or services available through the network member device 311. The second computer network 325 may require a user to input access information, such as an account and password information, for example. It should be understood that the access may be restricted in any desired manner. For example, even if the computer network 318 is connected to and communicates with the second computer network 325, the network member device 311 may be set up to deny access to the second computer network 325 by the wireless device 304. Alternatively, the network member device 311 may be configured so that such access is limited in a predetermined way. Moreover, access may be limited to certain members of the computer network 318.

Another advantageous feature of the communication system 300 is that it may implement a virtual private network (VPN) for a visiting wireless device 304. The fixed computer device 311 therefore may be configured to provide a VPN that tunnels the computer network 318 and the second network 325 in order to access an organization computer network of the mobile user. Consequently, the system 300 is able to not only provide a secure access to a remote computer network, but also is able to provide privacy. As a result, the data that the user transmits through the computer network 318 cannot be converted to plain, unencrypted digital data by any computers of the computer network 318, or even by a system administrator. The data packets can securely reach a destination network, where they may be converted back to plain, unencrypted digital data. The conversion at the destination network may be performed by a proxy, similar to the fixed computer device 311, that includes the necessary software.

The advantage provided to the mobile device 304 by this feature of the invention is an improved ability to access an associated organization from a remote point. The user may be charged for the service, but any trusted point of access (i.e., any relevant fixed computer device 311) can recognize a qualified wireless device 304 and provide a connection. Moreover, when data for the wireless device 304 is received in the bridge 429 and modem card 424 (see FIG. 4 below), it may be secured by any manner of cryptographic process. The data therefore may not be eavesdropped when being wirelessly communicated between the wireless device 304 and the fixed computer device 311.

The advantage of performing cryptographic processes in the fixed computer device 311 over performing cryptographic processes in the mobile device 304 is the limited amount of electrical power, processing speed, and memory available in the mobile device 304. The fixed computer device 311 is able to provide the data security without increasing the processing and electrical power load of the wireless device 304.

Figure 4:
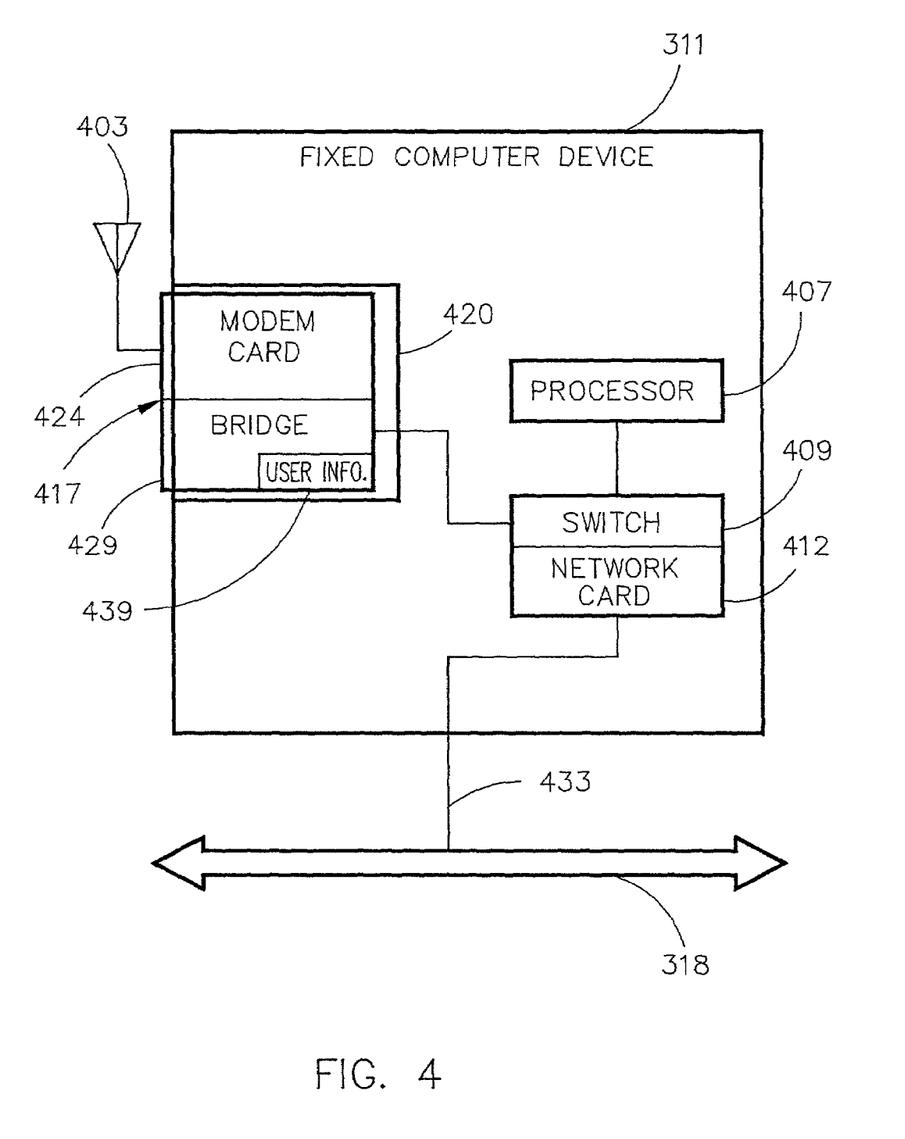
FIG. 4 shows detail of the network member device according to one embodiment of the invention.

FIG. 4 shows detail of the network member device 311 according to one embodiment of the invention. The network member device 311 may include a processor 407, a network card 412, an interface 420 and a network link 433. In addition, the network member device 311 may include a wireless communication card 417 that further includes a modem card 424 and an associated antenna 403 and a bridge 429. In addition, the network member device 311 includes a switch 409.

The processor 407 performs traditional functions of the network member device 311, and employs the network card 412 and the network link 433 to communicate with the computer network 318. The network link 433 may be any manner of network, wiring or cabling, such as an Ethernet cable, for example.

The interface 420 may be an expansion slot within the network member device 311. The interface 420 may be included in order to accommodate extra memory, plug-in network cards, co-processors, hard disks, etc. The interface 420 may be an expanded input/output (EIO) slot, for example. The interface 420 as an expansion slot is generally a standard existing feature on most mid-range and high-end printers, for example. The interface 420 is exploited by the invention to provide a trusted point of access to the computer network 318.

The modem card 424 may be any type of standard modem card capable of communicating with a wireless device. The modem card 424 performs data conversion and performs wireless transmission and reception of data, such as through radio frequency (RF) communications. The modem card 424 may operate according to any known wireless protocol, such as cellular formats, BLUETOOTH, etc.

The bridge 429 may be a typical computer network bridge that performs protocol, conversions, routing, etc. The bridge 429 may typically include a coprocessor board that includes a microprocessor and some memory, including embedded software. Alternatively, some of the functions of the bridge 429 could be performed by a co-processor in the network member device 311.

In order to perform routing, the bridge 429 may be connected to the switch 409, with the switch 409 being interposed between the network card 412 and the processor 407. The switch 409 allows the network member device 311 to receive packets that are not destined for the processor 407 and allows them to be forwarded to the correct destination. This functionality is commonly known as switching and the switch 409 therefore acts like a router (but generally with less intelligence).

When a user is a guest of the network member device 311, the wireless device 304 (not shown) may access the network member device 311 using pre-stored information. For example, the network member device 311 may include a user information storage 439 that may contain user information such as one or more accounts that are allowed to access the network member device 311. The user information storage 439 may include information such as listings of devices and resources that may be accessed by a particular user account, permitted access times, etc. This may further include information previously created and stored accounts and guest accounts. Moreover, the user information storage 439 may include guest accounts spontaneously created by a user who has not been previously granted access privileges. A guest account may be created with any desired level of accessibility, including no expiration time or no access restrictions.

In operation, the modem card 424 conducts wireless communications with one or more wireless devices 304. The modem card 424 also communicates with the bridge 429. The bridge 429 communicates with the computer network 318 (and therefore is further capable of communicating with the second network 325 via the proxy 323). To the computer network 318, the wireless device 304 therefore looks like the network member device 311. This is what allows network packets to be passed back and forth between the computer network 318 and the wireless device 304 without any need for configuration changes or setup to the computer network 318. As a direct result, a wireless communication port may be transparently added to an existing computer network 318, yet with all of the features of a wireless modem/server that provides security features.

In an optional feature, the network member device 311 may wirelessly broadcast a wireless trusted point of access availability. The broadcast may include a location of the network member device 311, such as a universal resource locator (URL), IP address, Ethernet address, etc. This may serve as a beacon to wireless devices 304. Since a wireless device 304 may receive multiple broadcasts, the user therefore may have the ability to choose a preferred wireless point of access.

Because the network member device 311 enables a direct hook-up between the wireless device 304 and the computer network 318, there may be a need for the network member device 311 to perform security and access control. This is done when communication is initiated by the wireless device 304. Upon contact by the wireless device 304, the computer network 318 configures the bridge 429 to accept potential connections and initializes any needed parameters. This may include determining who can connect (a login identification may be requested and verified if access is not open to anyone), determining a session or transaction charge for the service (if any), determining what other devices the wireless device 304 can access (i.e., access only network member device 311, access the local computer network 318, access the second network 325, unlimited access, etc.). Alternatively, the network member device 311 may configure the bridge 429 and therefore may determine the access conditions and may initialize the access parameters.

Through the network member device 311 the wireless device 304 may not only access the computer network 318, but may additionally access any other network accessible by the computer network 318. As a consequence, the network member device 311 may be used to access the Internet, where the second network 325 is the Internet. In this manner, the wireless device 304 may use an access capability of the network member device 311 without the need for an additional account to be set up or independently accessed. Moreover, if the second network 325 is the Internet, it may be used by the network member device 311 to access other remote networks, such as networks of other entities.

Figure 5:
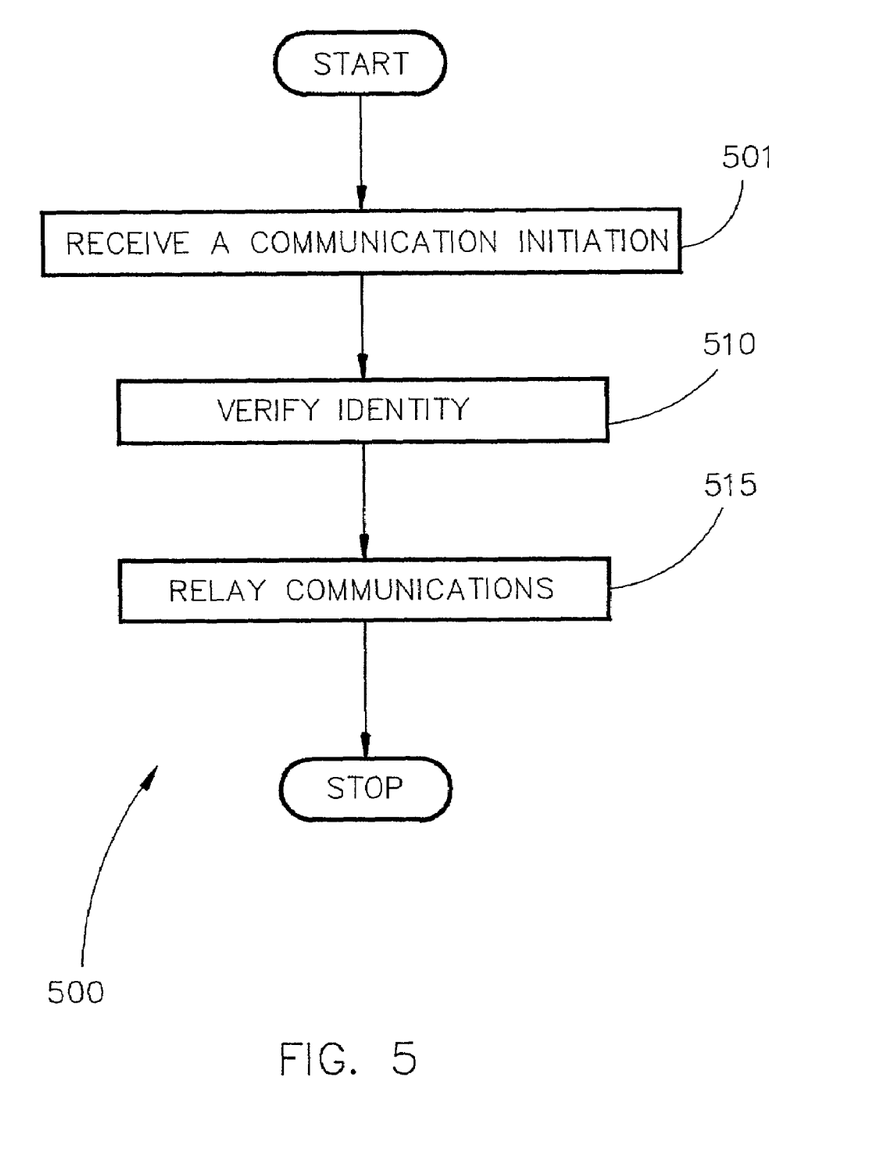
FIG. 5 is a flowchart of a wireless access method for a computer network.

FIG. 5 is a flowchart 500 of a wireless access method for a computer network. In step 501, a communication initiation from the wireless device 304 is received in the network member device 311 linked to the computer network 318.

In step 510, the identity of the wireless device 304 is verified in the network member device 311. This may include requesting an account and password information, for example. Optionally, the network member device 311 may also verify an identity of the user, such as by requesting a PIN number, etc. In addition, the user may be requested to enter credit card account information for purposes of charging the user for access. It should be noted that the account and payment information may be previously entered and stored.

In step 515, if the verification is successful, communications are relayed between the wireless device 304 and the network member device 311. Moreover, communications are relayed between the wireless device 304 and the computer network 318. In this manner, the wireless device 304 may be mobile and yet communicate with the computer network 318.

The wireless device 304 may establish and be charged for a session with the computer network 318 (and optionally the second network 325). Alternatively, the wireless device may establish a session with the first network 318 and may establish one or more sessions between the first computer network 318 and the second computer network 325. For example, the wireless device 304 may participate in multiple Internet sessions. The benefits of a session mode is that a secure channel may be created in order to work with a different organization or network. This is efficient when the user needs to execute multiple commands, and pays on the basis of the entire session.

Alternatively, the wireless device 304 may communicate on a transactional basis with the computer network 318. As a result, the wireless device 304 may be charged for access on the basis of each transaction with the computer network 318. Furthermore, the wireless device 304 may establish a session with the first computer network 318 and may establish one or more transactions between the first computer network 318 and the second computer network 325. The benefit of a transactional model is that a user is able to execute a small number of commands without payment of excessive cost. A good example of this is execution of a single print command.

Figure 6:
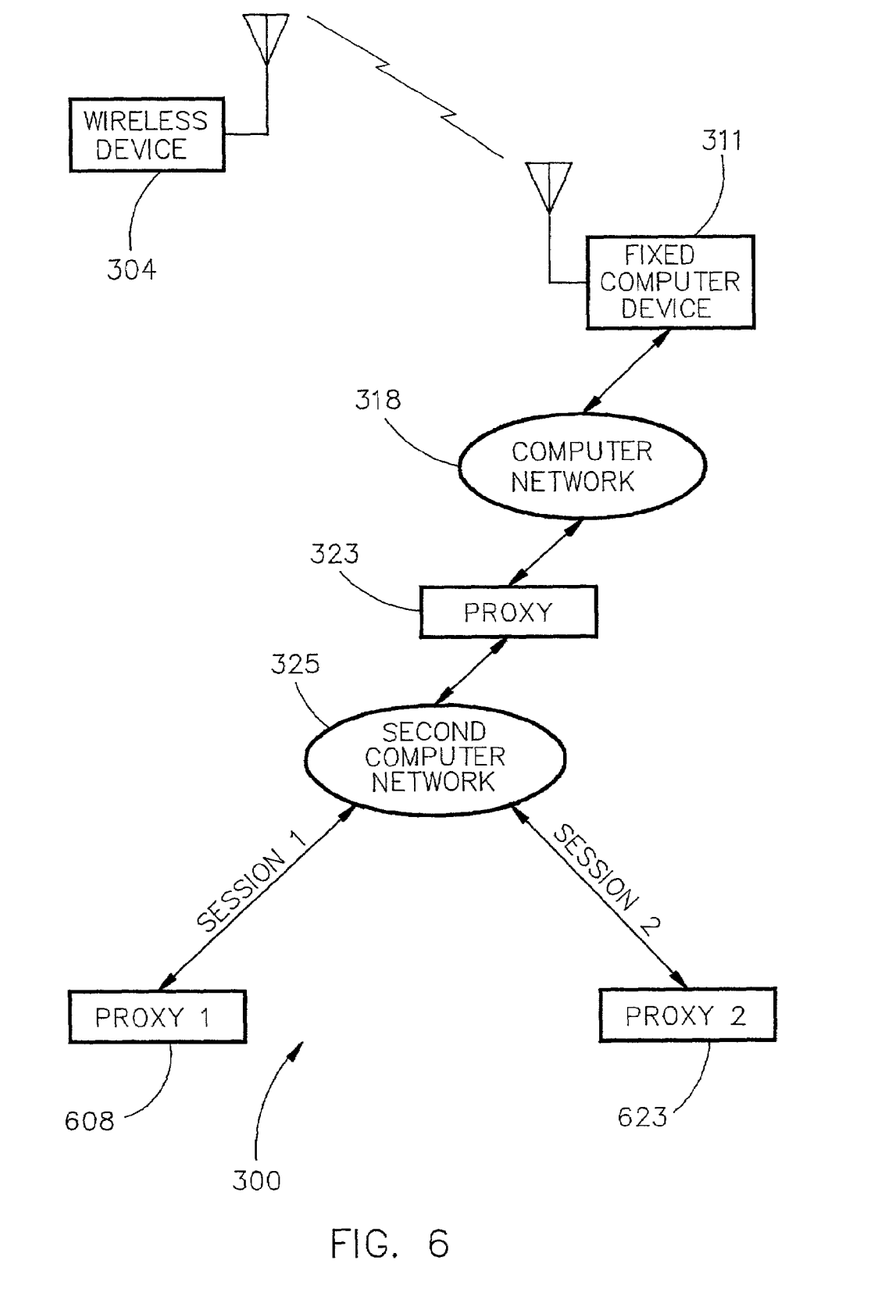
FIG. 6 shows the communication system wherein the wireless device is conducting multiple remote interactions.

FIG. 6 shows the communication system 300 wherein the wireless device 304 is conducting multiple remote interactions. In this figure, the wireless device 304 is engaging in multiple Internet sessions, such as Session 1 and Session 2, using the independent entities proxy one 608 and proxy two 623 connected to the second network 325. As a result, the wireless device 304 may independently communicate with multiple institutional networks. The second computer network 325 therefore may be used as a communication medium for communicating with other networks.

This capability enables wireless remote access to the second computer network 325 via the computer network 318, with the access point being local to the computer network 318. Consequently, the wireless device 304 does not have to be able to access all the remote Internet organizations itself, but may gain such access through the network member device 311.

Connection can be in a session mode where users are able to connect for a session. Alternatively, in a transactional mode, the user can execute single transactions. Each session or transaction may be an interaction with a device on another LAN, WAN, etc., such as a computer network of another organization.

The transactional mode may minimize cost if the user has to pay a fee for access to the network member device 311. In the transactional mode, a cost reduction over the prior art is realized due to a reduction in complexity of access to the computer network 318 and to the second computer network 325.

The wireless trusted point of access of the invention may provide a direct connection to the computer network 318. This wireless trusted point of access is a network member. There is no need for any intervening server, modem, or other network interface devices. Moreover, the network member device 311 may be a device that is always on and always ready for connection. Therefore, the user does not have to suffer through a dial-up time, for example.

In an additional benefit, the network member device 311 according to the invention may offer connections to visitors. For example, the network member device 311 may offer a pay-for-use connection for visitors and can charge per session or per transaction. Alternatively, a large corporation having multiple sites could use the network member device 311 to allow access (including mobile access) to employees at any office or facility, including access to employees visiting other offices or facilities within the organization. The invention is further capable of providing a transparent connection to the Internet, wherein the security is provided at the point of access and the user of the wireless device 304 may perform only one access operation.

The communication system 300 can be configured to allow the network member device 311 to access a limited number of types or sets of resources. This configuration may dictate access conditions, and may be independent of the user or independent of the type of wireless device 304.

We claim:

1. A communication system, comprising:
    a computer network comprising a plurality of interconnected member computer devices; and
    at least one of said plurality of member computer devices being a printing device capable of communicating with a mobile wireless device, said printing device being configured to establish and track one or more interactions between said mobile wireless device and said computer network;
    wherein said mobile wireless device is capable of communicating with said computer network directly through said printing device without said mobile wireless device being a member of said computer network such that said printing device operates as a proxy for the mobile wireless device with respect to the computer network.

2. The communication system of claim 1, wherein said printing device comprises:
    a network card communicating with said computer network over a wire link;
    a modem card adapted for communicating with said one or more mobile wireless devices in a wireless manner; and
    a bridge communicating with said modem card and with said network card and relaying communications between said modem card and with said network card, said bridge performing protocol conversions.

3. The communication system of claim 2, wherein said bridge performs routing.

4. The communication system of claim 2, further comprising:
a processor; and
a switch connected to said bridge and interposed between said network card and said router, said switch routing communications for said mobile wireless device to said bridge and routing communications for said printing device to said processor;
wherein communications for said mobile wireless device are relayed by said bridge to said wireless modem and then relayed by said wireless manner to said mobile wireless device.

5. The communication system of claim 1, wherein said computer network is capable of communicating with one or more other computer networks.

6. The communication system of claim 2, wherein said modem card and said bridge are housed in an expansion slot of the printing device.

7. The communication system of claim 1, wherein said printing device regulates a session-based access of said mobile wireless device to said computer network.

8. The communication system of claim 1, wherein said printing device regulates a transaction-based access of said mobile wireless device to said computer network.

9. The communication system of claim 1, wherein said printing device is configured to provide a virtual private network to said mobile wireless device.

10. A communication system, comprising
a computer network comprising a plurality of interconnected member computer devices;
at least one of said plurality of member computer devices being a printing device capable of communicating with a mobile wireless device, said at least one printing device being configured to establish and track one or more interactions between said mobile wireless device and said computer network, with said at least one printing device further comprising;
a network card communicating with said computer network over a wire link;
a modem adapted for communicating with said mobile wireless device in a wireless manner; and
a bridge communicating with said modem and with said network card and relaying communications between said modem and with said network card;
wherein said mobile wireless device is capable of communicating directly with said network through said printing device without said mobile wireless device being a member of said computer network such that said printing device operates as a proxy for the mobile wireless device with respect to the computer network.

11. A wireless access method for a computer network, comprising the steps of:
receiving a communication initiation in a printing device, wherein said printing device is a member of said computer network, said communication initiation being received from a mobile wireless device;
in said printing device, verifying an identity of said mobile wireless device; and
relaying communications between said mobile wireless device and said computer network, with said printing device performing the relaying such that the printing device operates as a proxy for the mobile wireless device with respect to the computer network;
wherein said mobile wireless device communicates with said computer network without being a member of said computer network.

12. The method of claim 11, further comprising the step of verifying an identity of a user of said mobile wireless device.

13. The method of claim 11, further comprising the step of tracking usage characteristics of said access method by said mobile wireless device, with said printing device performing said tracking.

14. The method of claim 11, further comprising the step of routing a communication from said mobile wireless device to another printing device within said computer network.

15. The method of claim 11, further comprising the step of relaying said communications to a second computer network through said computer network, with said computer network communicating with said second computer network.

16. The method of claim 11, wherein said relaying further comprises performing protocol conversion.

17. The method of claim 11, wherein said mobile wireless device possesses a pre-existing access privilege within said computer network.

18. The method of claim 11, wherein said mobile wireless device does not possess a pre-existing access privilege within said computer network.

19. The method of claim 11, wherein said printing device establishes and tracks an interaction between said mobile wireless device and said computer network.

20. The method of claim 11, wherein said printing device establishes and tracks one or more interactions between said mobile wireless device, said computer network, and one or more other computer networks.

* * * * *